(12) United States Patent
Miki et al.

(10) Patent No.: US 8,869,649 B2
(45) Date of Patent: Oct. 28, 2014

(54) BICYCLE SHIFT OPERATING DEVICE

(75) Inventors: Yoshimitsu Miki, Osaka (JP); Kazutaka Fukao, Osaka (JP); Kazunori Okubo, Osaka (JP); Shinji Kawamura, Naka (JP)

(73) Assignee: Shimano Inc., Osaka (JP)

( * ) Notice: Subject to any disclaimer, the term of this patent is extended or adjusted under 35 U.S.C. 154(b) by 155 days.

(21) Appl. No.: 13/180,606

(22) Filed: Jul. 12, 2011

(65) Prior Publication Data

US 2013/0014607 A1    Jan. 17, 2013

(51) Int. Cl.
| F16C 1/12 | (2006.01) |
| B62M 25/00 | (2006.01) |
| B62J 99/00 | (2009.01) |
| B62K 23/06 | (2006.01) |

(52) U.S. Cl.
CPC .............. *B62J 99/00* (2013.01); *B62M 25/00* (2013.01); *B62K 23/06* (2013.01)
USPC ....................................... 74/501.6

(58) Field of Classification Search
USPC ............................. 74/501.6, 502.2
See application file for complete search history.

(56) References Cited

U.S. PATENT DOCUMENTS

| 5,847,641 | A | | 12/1998 | Jinbo |
| 5,903,214 | A | | 5/1999 | Watarai |
| 6,012,353 | A | * | 1/2000 | Kawakami ................ 74/502.2 |
| 6,129,580 | A | * | 10/2000 | Kishimoto ................. 439/496 |
| 6,142,281 | A | | 11/2000 | Campagnolo |
| 2002/0020246 | A1 | | 2/2002 | Campagnolo |
| 2004/0163486 | A1 | * | 8/2004 | Irie et al. ................... 74/502.2 |
| 2005/0251301 | A1 | * | 11/2005 | Suzuki ........................ 701/23 |
| 2006/0082362 | A1 | * | 4/2006 | Hino et al. ................. 324/207.2 |
| 2007/0184925 | A1 | * | 8/2007 | Ichida et al. ................... 474/80 |
| 2009/0054182 | A1 | * | 2/2009 | Miki et al. ..................... 474/80 |
| 2010/0162848 | A1 | * | 7/2010 | Suzuki ........................... 74/504 |

FOREIGN PATENT DOCUMENTS

| DE | 10027193 A1 * | 12/2001 | ............. B62K 23/04 |
| EP | 2 030 890 A1 | 3/2009 | |

OTHER PUBLICATIONS

European Search Report of corresponding EP Application No. 12 15 1547.2 dated Aug. 31, 2012.

* cited by examiner

*Primary Examiner* — Vicky Johnson
(74) *Attorney, Agent, or Firm* — Global IP Counselors

(57) ABSTRACT

A bicycle shift operating device is provided with a base member, a shift unit and a position sensing device. The base member includes a body portion with an internal cavity. The shift unit is disposed in the internal cavity of the body portion. The shift unit includes a movable portion that selectively moves between a plurality of predetermined operating positions. The position sensing device is removably attached to the body portion while the base member is attached to a bicycle. The position sensing device includes a sensor component that senses the operating position of the movable portion.

19 Claims, 10 Drawing Sheets

BICYCLE SHIFT OPERATING DEVICE

BACKGROUND

1. Field of the Invention

This invention generally relates to a bicycle shift operating device. More specifically, the present invention relates to a bicycle shift operating device that has position sensing device for determining an operating position of a shift operating unit disposed within a base member of the bicycle shift operating device.

2. Background Information

Most bicycles are provided with a drive train having multiple gears that allows the rider to select a particular gear for a particular situation. There are many types of shifting arrangements and drive trains that are currently available on the market. In most cases, a gear position indicator is provided to inform the rider of the current gear selection. In the case of mechanical shift operating device, a mechanical gear position indicator is often used to indicate the gear position. Some of these mechanical gear position indicators are operated by a cable that is connected to the shift operating device. Typically, a separate gear position indicator is provided for each of the shift operating devices.

Recently, bicycles have been provided with cycle computers to inform the rider of various traveling conditions of the bicycle. These cycle computers typically provide the rider with information about the current gear position. When a cycle computer is used, the cycle computer can display the gear position for each of the shift operating devices in a single display unit at a central location of the handlebar. This very convenient for the rider. In order to use the cycle computer to display the current gear positions of the derailleurs, the cycle computer needs to receive electrical signals that are indicative of the gear positions of the derailleurs. One example of such a device is disclosed in U.S. Pat. No. 6,142,281 to Campagnolo. In this patent, a bicycle speed changing device is provided with a transducer device for sending an electric signal that is indicative of a transmission ratio selected by the speed changing device. The transducer device is mounted to an auxiliary support body that is positioned between a main support body and a handlebar of the bicycle when the bicycle speed changing device is attached to the handlebar of the bicycle. Another example of a bicycle speed changing device with an electronic gear position indicator is disclosed in U.S. Patent Application Publication No. 2009/0054182.

SUMMARY

One aspect of the present disclosure is to provide a bicycle shift operating device that is provided with a position sensing device that can be replaced while the bicycle shift operating device is attached to a bicycle.

In view of the state of the known technology, a bicycle shift operating device is provided that basically comprises a base member, a shift unit and a position sensing device. The base member includes a body portion with an internal cavity. The shift unit is disposed in the internal cavity of the body portion. The shift unit includes a movable portion that selectively moves between a plurality of predetermined operating positions. The position sensing device is removably attached to the body portion while the base member is attached to a bicycle. The position sensing device includes a sensor component that senses the operating position of the movable portion.

Various objects, features, aspects and advantages of the present disclosure will become apparent to those skilled in the art from the following detailed description, which, taken in conjunction with the annexed drawings, discloses two embodiments of a bicycle shift operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
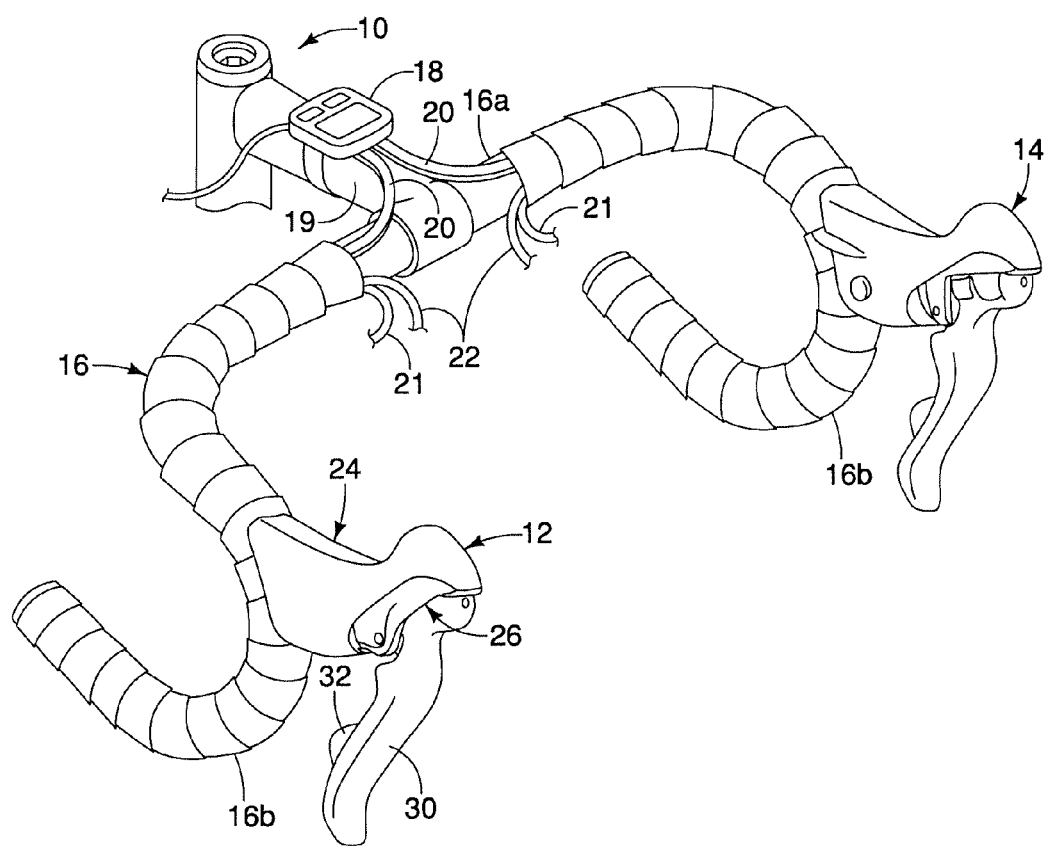
FIG. 1 is a front perspective view of a portion of a bicycle equipped with a pair of bicycle shift operating devices coupled to a drop type handlebar in their installed positions in accordance with a first embodiment.

Referring initially to FIG. 1, a portion of a bicycle 10 that is equipped with a pair of bicycle shift operating devices 12 and 14 is illustrated. The bicycle shift operating devices 12 and 14 are mounted on a drop down handlebar 16 in accordance with the illustrated embodiments as seen in FIG. 1. The drop down handlebar 16 typically includes a straight cross portion 16a and a pair of downwardly curved portions 16b. The straight cross portion 16a connects upper ends of the downwardly curved portions 16b. The shift operating devices 12 and 14 are mounted to the downwardly curved portions 16b of the drop down handlebar 16.

The bicycle 10 is also equipped with a cycle computer 18. The cycle computer 18 is mounted on a handlebar stem 19, as shown, or on the handlebar 16 for providing information to the rider, including but not limited to, current gear or operating positions based on electrical signals received from the bicycle shift operating devices 12 and 14 as explained below. In the illustrated embodiment, the current shift or operating positions of the bicycle shift operating devices 12 and 14 typically correspond to the positions of gear shifting devices (e.g., derailleurs—not shown). Thus, the electrical signals from the bicycle shift operating devices 12 and 14 are preferably indicative of the gear positions of the gear shifting devices.

The cycle computer 18 is electrically connected to the bicycle shift operating devices 12 and 14 by a pair of electrical wires 20 for receiving electrical signals that are indicative of the current operating positions of the bicycle shift operating devices 12 and 14. The cycle computer 18 is typically connected to one or more sensors (not shown) such as a sensor that detects rotation of one of the wheels of the bicycle 10 to indicate a traveling speed of the bicycle 10. The cycle computer 18 is relatively conventional and will not be discussed and/or illustrated in detail herein.

The bicycle shift operating device 12 is a right hand side control device operated by the rider's right hand to operate a first brake device (not shown) and a first gear shifting device (e.g., a cable operated rear derailleur). The bicycle shift operating device 14 is a left hand side control device operated by the rider's left hand to operate a second brake device (not shown) and a second gear shifting device (e.g., a cable operated front derailleur). The first and second gear shifting devices are part of a conventional bicycle driving system that is used to shift a bicycle chain for changing speeds of the drive train in a relatively conventional manner. In the illustrated embodiment, the bicycle shift operating devices 12 and 14 are each operatively coupled to a gear shifting device via a shift control cable 21 and to a brake device via a brake control cable 22.

Figure 2:
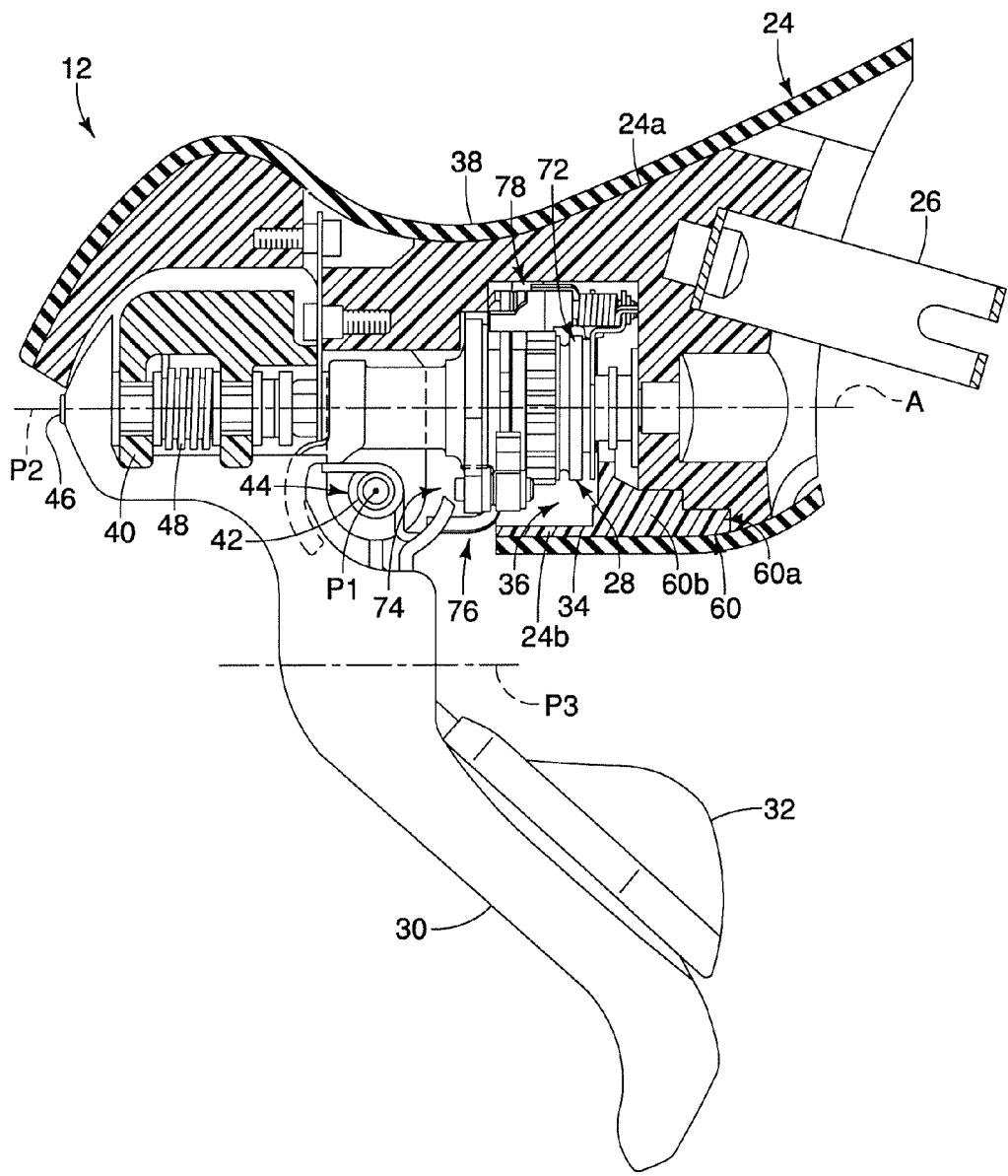
FIG. 2 is an inside elevational view of the right hand side shift operating device with the selected parts shown in cross section.
Figure 3:
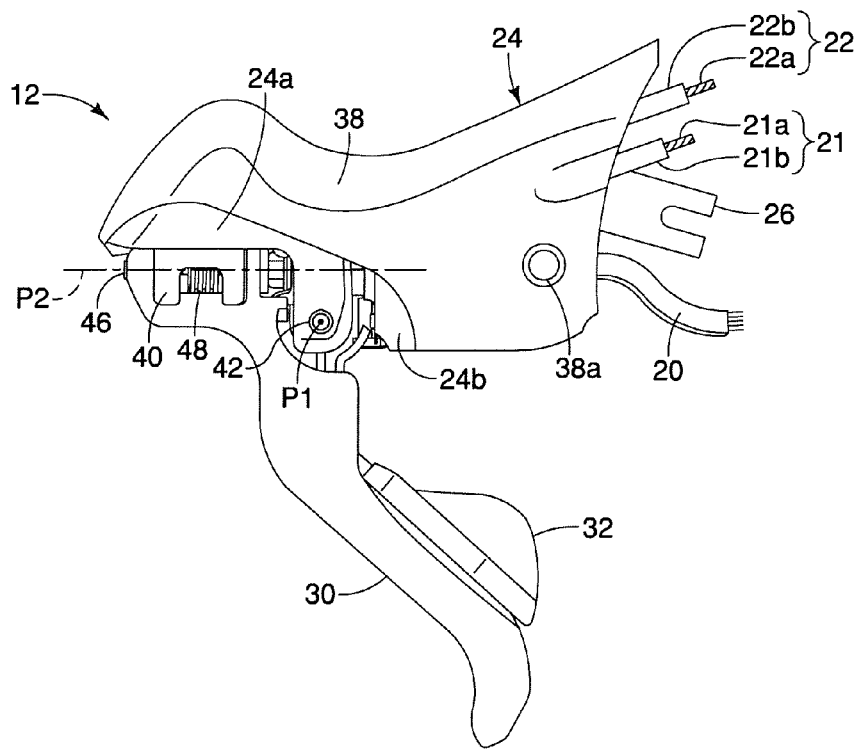
FIG. 3 is an inside elevational view of the right hand side shift operating devices illustrated in FIGS. 1 and 2 with the brake/shift operating lever and the shift (release) lever in their rest positions.

As seen in FIGS. 2 and 3, preferably, the control cables 21 and 22 are conventional bicycle operating cables that have an outer case covering an inner wire. In other words, each of the control cables 21 and 22 are Bowden type cables basically include an inner wire slidably received within an outer case. For example, as seen in FIG. 3, the shift control cable 21 has an inner wire 21a with an outer case 21b covering the inner wire 21a, while the brake control cable 22 has an inner wire 22a with an outer case 22b covering the inner wire 22a. The inner wire 21a constitutes a connecting member that operatively connects the bicycle shift operating device 12 to the first gear shifting device for shifting the corresponding gear shifting device in response to operation of the bicycle shift operating device 12.

While the bicycle shift operating devices 12 and 14 are illustrated as bicycle shift operating device that combine both shifting and braking using Bowden type cables, the bicycle shift operating devices 12 and 14 are not limited to bicycle shift operating device that combine both shifting and braking using Bowden type cables. For example, the bicycle shift operating devices 12 and 14 can be configured for performing only shifting. Also the bicycle shift operating devices 12 and 14 can be configured for performing braking using a hydraulic operating unit.

In this embodiment, as best seen in FIG. 2, the bicycle shift operating device 12 basically includes a bracket 24, a handlebar mounting structure 26, a shift unit 28, a brake/shift operating lever 30 (e.g., a first operating lever) and a shift operating lever 32 (e.g., a second operating lever). The bicycle shift operating device 12 also includes a position sensing device 34. The position sensing device 34 constitutes an operating positioning indicator. Thus, the position sensing device 34 produces an electrical signal that is indicative of an operating (e.g., gear or shift) position of the shift unit 28 based on a current position of a movable portion of the shift unit 28 as discussed below. The position sensing device 34 is removably attached to the body portion 24a while the bracket 24 is attached to the handlebar 16 of the bicycle 10.

As seen in FIG. 2, the bracket 24 constitutes a base member that basically includes a body portion 24a and an access cover 24b. An interior space or internal cavity 36 of the bracket 24 is defined by the body portion 24a and the access cover 24b. Typically, the body portion 24a and the access cover 24b of the bracket 24 are made of a rigid, hard plastic material. Riders sometimes grip the bracket 24 and lean on the bracket 24 during riding. It is desirable to provide a comfortable feeling for the rider's hand while the rider is gripping the bracket 24. Thus, the bracket 24 has a rigid main body that is covered with a soft outer elastomeric grip cover 38. The grip cover 38 partially covers the bracket 24 as seen in FIG. 3. In particular, the grip cover 38 is stretched over a gripping portion of the bracket 24.

As seen in FIG. 2, the shift unit 28 is disposed in the internal cavity 36 of the body portion 24a. The brake/shift operating lever 30 and the shift operating lever 32 are operatively coupled to the shift unit 28 for performing shifting operations as explained below. In particular, the brake/shift operating lever 30 and the shift operating lever 32 are both movable with respect to the body portion 24a of the bracket 24 to operate the shift unit 28. In the illustrated embodiment, the brake/shift operating lever 30 and the shift operating lever 32 are trigger type levers that are biased to the rest positions in a conventional manner. The term "rest position" as used herein refers to a state in which the part (e.g., the brake/shift operating lever 30 and the shift operating lever 32) remains stationary without the need of a user holding the part in that state corresponding to the rest position. The brake/shift operating lever 30 and the shift operating lever 32 are examples of user operated levers used for operating the shift unit 28 as discussed below.

Figure 4:
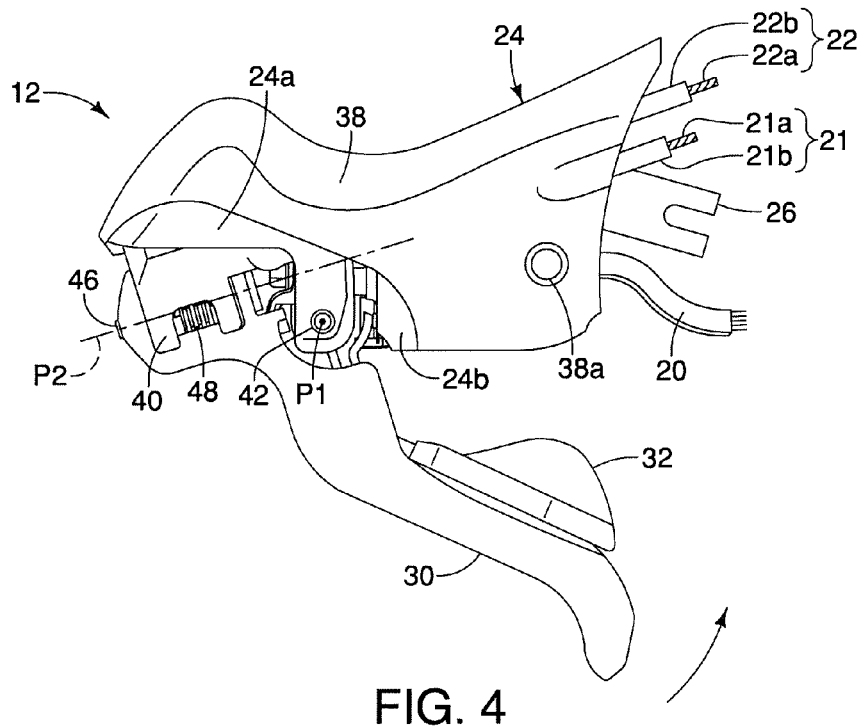
FIG. 4 is an inside elevational view of the right hand side shift operating device illustrated in FIG. 3 with the brake/shift operating lever pivoted to a braking position.

As seen in FIGS. 3 and 4, the brake/shift operating lever 30 is used to perform a braking operation. FIG. 3 illustrates the brake/shift operating lever 30 in the rest position, while FIG. 4 illustrates the brake/shift operating lever 30 in a braking position. The brake/shift operating lever 30 is pivotally mounted relative to the body portion 24a of the bracket 24 about a brake (first) pivot axis P1 that extends transverse to the lateral surfaces of the bracket 24 to perform a braking operation. This pivotal movement of the brake/shift operating lever 30 from the rest position to the braking position along a non-shift operating path pulls the inner wire 22a of the brake cable 22 to operate a brake device (not shown). Thus, the brake/shift operating lever 30 functions as a brake lever.

Figure 5:
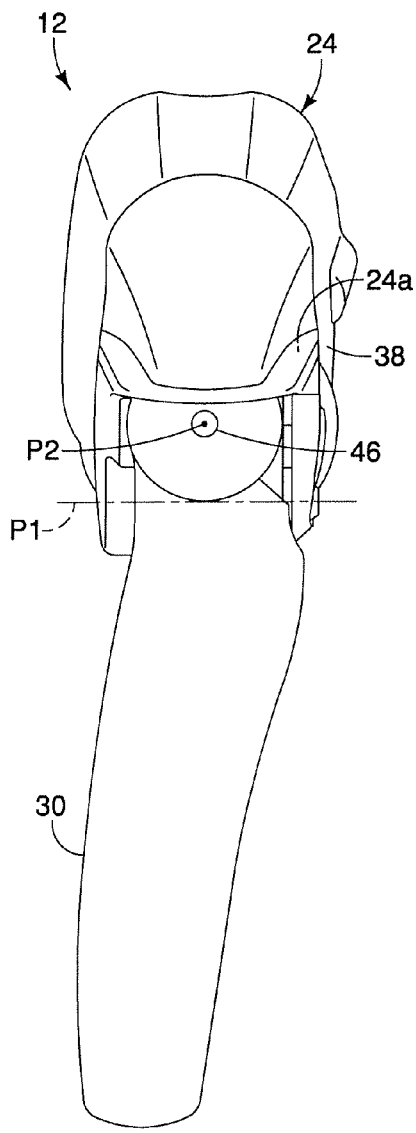
FIG. 5 is a front elevational view of the right hand side shift operating device illustrated in FIGS. 1 to 4 with the brake/shift operating lever and the shift (release) lever in their rest positions.
Figure 6:
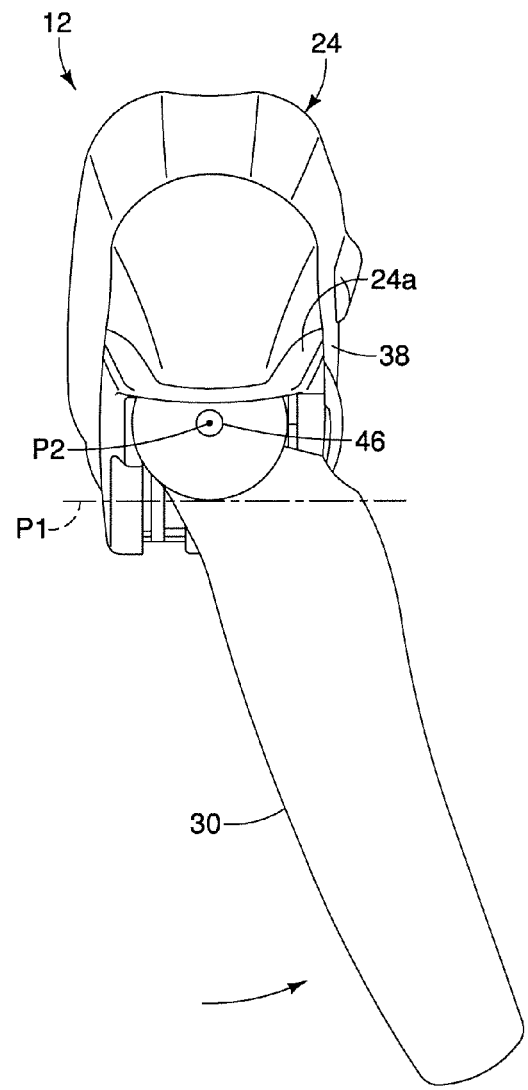
FIG. 6 is a front elevational view of the right hand side shift operating device illustrated in FIG. 5, but with the brake/shift operating lever of the right hand side shift operating device moved to a cable winding position.

As seen in FIGS. 5 and 6, the brake/shift operating lever 30 is also used to perform a shifting operation. FIG. 5 illustrates the brake/shift operating lever 30 in the rest position, while FIG. 6 illustrates the brake/shift operating lever 30 in a shift operating position. The shift (second) pivot axis P2 is non coaxial with respect to the brake (first) pivot axis P1. The brake/shift operating lever 30 is also pivotally mounted relative to the body portion 24a of the bracket 24 about a shift (second) pivot axis P2 along a plane that is transverse to a braking plane of the brake/shift operating lever 30. Specifically, the rider pivots the brake/shift operating lever 30 about the shift (second) pivot axis P2 in a direction towards a bicycle longitudinal center plane. This pivotal movement of the brake/shift operating lever 30 from the rest position to the shift operating position pulls the inner wire 21a of the shift cable 21. Thus, the brake/shift operating lever 30 functions as a cable pulling lever.

As seen in FIG. 2, the brake/shift operating lever 31 is provided with a support member 40 for movably supporting the brake/shift operating lever 30 and the shift operating lever 32 on the body portion 24a of the bracket 24. The support member 40 is pivotally attached to the body portion 24a of the bracket 24 by a pivot pin 42 that defines the brake pivot axis P1. The pivot pin 42 is located in holes of pivot attachment portions of the body portion 24a of the bracket 24. A biasing element 44 is provided between the body portion 24a and the support member 40. The biasing element 44 is arranged for biasing the support member 40 and the brake/shift operating lever 30 to the rest position as seen in FIG. 2. In the illustrated embodiment, the biasing element 44 is a torsion spring with its coiled portion disposed on the pivot pin 42 and its first and second free ends contacting the body portion 24a and the support member 40, respectively.

Still referring to FIG. 2, the brake/shift operating lever 30 is pivotally attached to the support member 40 by a pivot pin 46 that defines the shift pivot axis P2. A biasing element 48 is provided between the brake/shift operating lever 30 and the support member 40. The biasing element 48 is arranged for biasing the brake/shift operating lever 30 to the rest position. In the illustrated embodiment, the biasing element 48 is a torsion spring with its coiled portion disposed on the pivot pin 46 and its first and second free ends contacting the brake/shift operating lever 30 and the support member 40, respectively.

Figure 7:
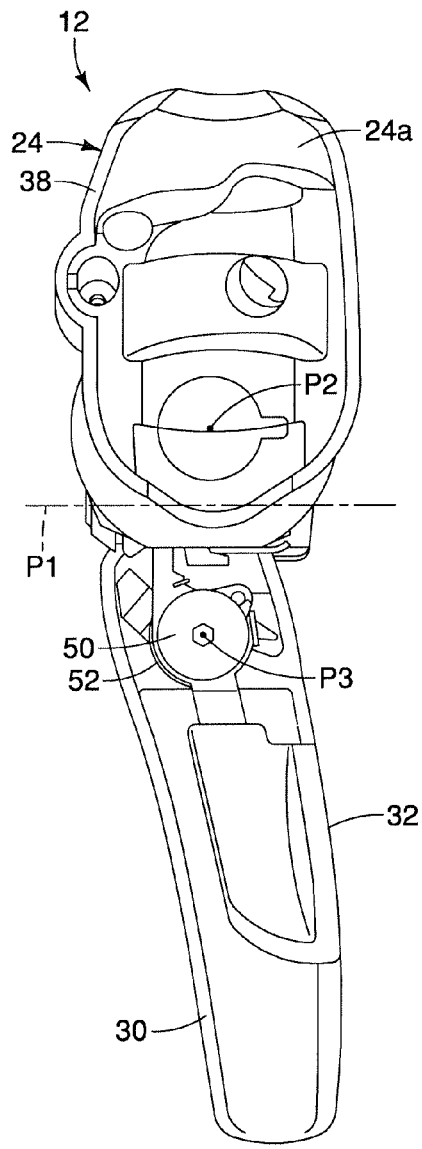
FIG. 7 is a rear elevational view of the right hand side shift operating device illustrated in FIGS. 1 to 6 with the brake/shift operating lever and the shift (release) lever in their rest positions.
Figure 8:
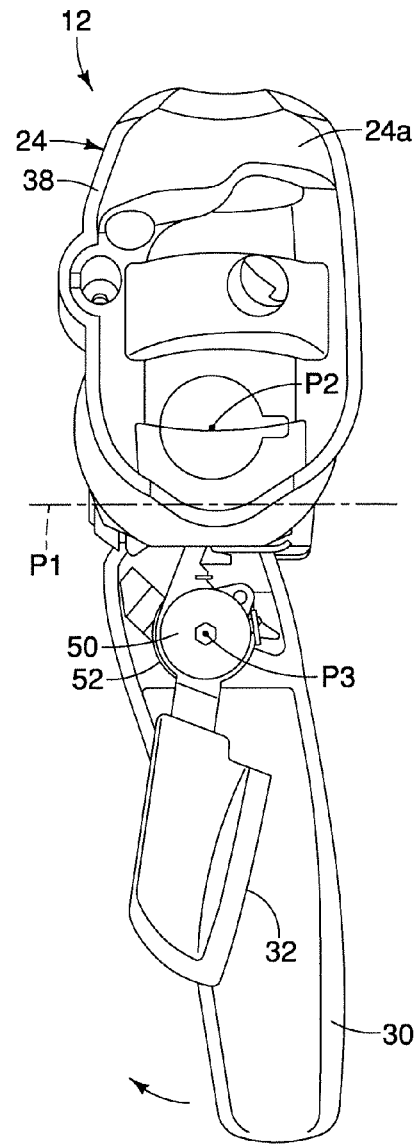
FIG. 8 is a rear elevational view of the right hand side shift operating device illustrated in FIG. 7, but with the shift (release) lever moved to a cable releasing position.

As seen in FIGS. 7 and 8, the shift operating lever 32 is operatively coupled to the shift unit 28 for performing shifting operations (i.e., a cable releasing operations). FIG. 7 illustrates the shift operating lever 32 in the rest position, while FIG. 7 illustrates the shift operating lever 32 in a shift operating position. In particular, the shift operating lever 32 is pivotally mounted on the brake/shift operating lever 30 such that the shift operating lever 32 pivots relative to the brake/shift operating lever 30 about a shift (third) pivot axis P3 between the rest position and the shifting position. The brake/shift operating lever 30 and the shift operating lever 32 are arranged such that the shift pivot axes P2 and P3 are offset. The shift operating lever 32 only performs shifting operations. The shift operating lever 32 does not operate the shift unit 28 when the brake/shift operating lever 30 is pivoted about the shift (second) pivot axis P2. In the illustrated embodiment, the shift operating lever 32 releases the inner wire 21a from the shift unit 28 when the shift operating lever 32 is pivoted about the shift pivot axis P3 towards the center longitudinal plane of the bicycle 10. Thus, the shift operating lever 32 constitutes as a cable releasing lever.

In the illustrated embodiment, the shift operating lever 32 moves with the brake/shift operating lever 30 as the brake/shift operating lever 30 is moved to perform braking operations and shifting operations as shown in FIGS. 4 and 6. However, the brake/shift operating lever 30 generally remains stationary during movement of the shift operating lever 32 to perform shifting operations as seen in FIG. 8.

As seen in FIGS. 7 and 8, the shift operating lever 32 is also pivotally mounted to the brake/shift operating lever 30 by a bolt 50 that defines the shift pivot axis P3. The shift pivot axis P3 can be either parallel to the shift pivot axis P2, as illustrated, or angled with respect to the shift pivot axis P2 as viewed in a direction parallel to the brake pivot axis P1. A biasing element 52 is provided between the brake/shift operating lever 30 and the shift operating lever 32 for biasing the shift operating lever 32 to a rest position. In the illustrated embodiment, the biasing element 52 is a torsion spring with its coiled portion disposed on the pivot pin 50 and its first and second free ends contacting the brake/shift operating lever 30 and the shift operating lever 32, respectively.

Referring back to FIGS. 1 and 3, the body portion 24a has a first end with the handlebar mounting structure 26 (FIG. 2) for fixedly mounting the bracket 24 to one of the curved portions 16b of the drop down handlebar 16 (FIG. 1). The bracket 24 is a stationary member when mounted to the handlebar 16. Since the bracket 24 is fixed to the drop down handlebar 16 by the handlebar mounting structure 26, the bracket 24 constitutes a fixed member with respect to the drop down handlebar 16. The handlebar mounting structure 26 is preferably a conventional band clamp or similar structure that is used in a road shifter for mounting to a drop down style handlebar such as the drop down handlebar 16. Thus, the handlebar mounting structure 26a will not be discussed in further detail herein.

Figure 9:
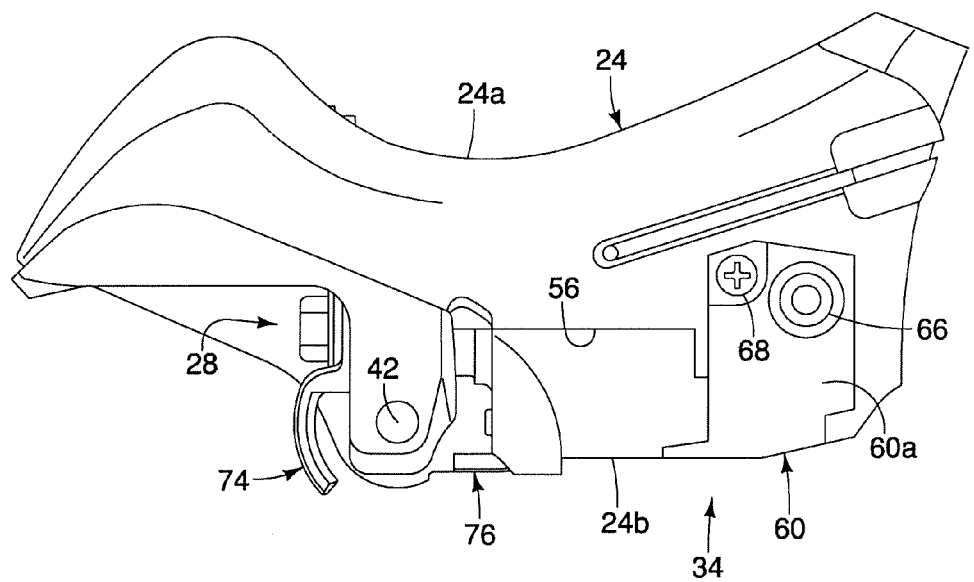
FIG. 9 is a side elevational view of the bracket (base member) and the shift operating unit with the bottom access cover installed over a portion of the insertion opening of the bracket.
Figure 10:
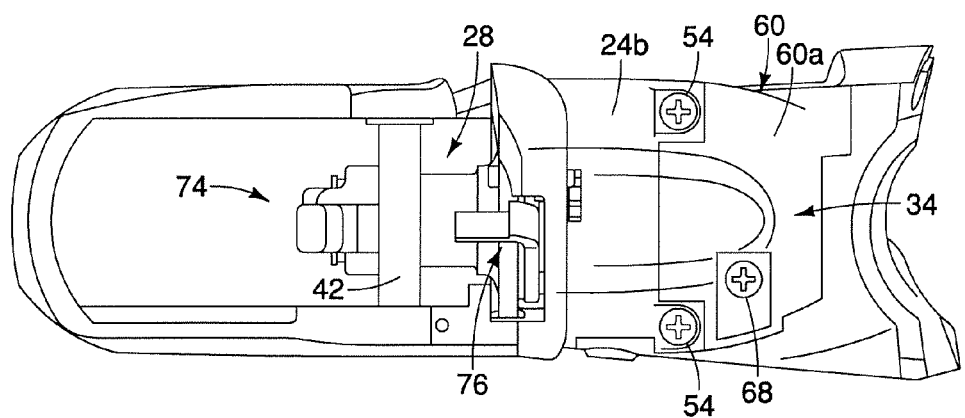
FIG. 10 is a bottom plan view of the bracket and the shift operating unit with the bottom access cover installed over a portion of the insertion opening of the bracket.
Figure 11:
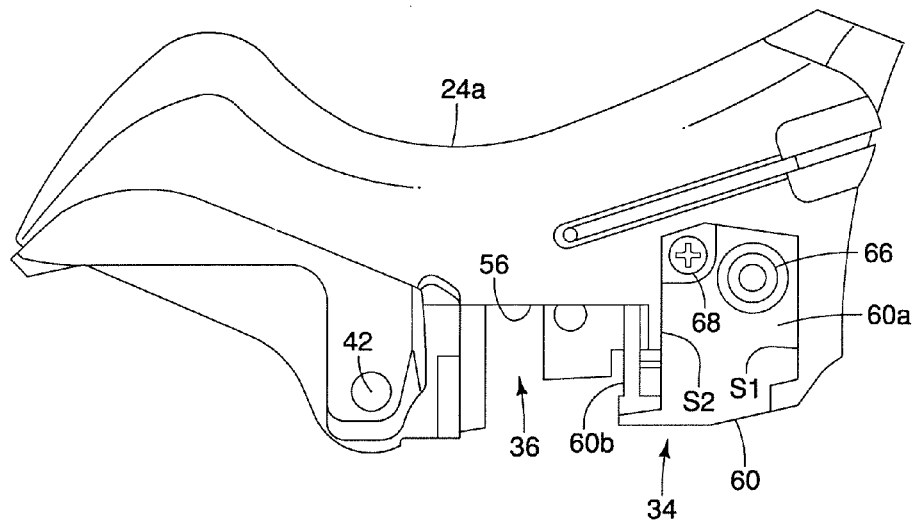
FIG. 11 is a side elevational view of the bracket and the shift operating unit with the bottom access cover and the shift operating unit removed.

Referring now to FIGS. 9 and 10, the access cover 24b is removably attached to the body portion 24a of the bracket 24 by a pair of fasteners 54 (e.g., screws). Of course, the access cover 24b can be removably attached to the main body of the bracket 24 in other ways such as a snap-fit arrangement, one fastener or more than three fasteners. The access cover 24b at least partially closing an insertion opening 56 of the body portion 24a. The insertion opening of the body portion 24a is provided on the bottom surface of the body portion 24a for providing access into the internal cavity 36 of the body portion 24a. However, the insertion opening 56 of the body portion 24a is not limited to the bottom surface of the body portion 24a. Rather, the body portion 24a can be reconfigured such that the insertion opening 56 is on either lateral sides of the body portion 24a or on the top surface of the body portion 24a.

Referring now to FIGS. 9 to 13, the position sensing device 34 basically includes a support portion 60, a printed circuit board 62, a sensor component 64 and a user operating switch 66. The position sensing device 34 constitutes an operating position indicator. Thus, the position sensing device 34 produces electrical signals that are indicative of an operating (e.g., gear or shift) position of the shift unit 28 based on a current position of a movable portion of the shift unit 28 as discussed below. The position sensing device 34 is removably attached to the body portion 24a while the bracket 24 is attached to the handlebar 16 of the bicycle 10. In this way, the position sensing device 34 can be serviced or replaced without removing the bracket 24 from the handlebar 16 of the bicycle 10.

The support portion 60 supports the printed circuit board 62, the sensor component 64 and the user operating switch 66 on the body portion 24a of the bracket 24. In the illustrated embodiment, the support portion 60 is attached to the body portion 24a of the bracket 24 in a releasable and re-installable manner by a pair of fasteners 68. Of course, the support portion 60 can be removably attached to the main body of the bracket 24 in other ways such as a snap-fit arrangement, one fastener or more than three fasteners. The axis directions of the fasteners 68 are different. As mentioned above, the body portion 24a has the insertion opening 56 in communication with the internal cavity 36 of the body portion 24a that is used for installing the shift unit 28. This insertion opening 56 is also used for inserting and removing a portion of the position sensing device 34 into the internal cavity 36 of the body portion 24a that contains the shift unit 28. In particular, the support portion 60 has a first part 60a and a second part 60b. The first part 60a supports the printed circuit board 62 and the user operating switch 66. The first part 60a is releasably attached to the body portion 24a of the bracket 24 by the fasteners 68. The second part 60b extends from the first part 60a into the internal cavity 36 of the body portion 24a when the support portion 60 is attached to the body portion 24a. As a result, the second part 60b supports parts of the sensor component 64 inside the internal cavity 36 of the body portion 24a when the support portion 60 is attached to the body portion 24a. In this way, the printed circuit board 62 and the sensor component 64 of the position sensing device 34 are inserted and removed through the insertion opening 56 of the body portion 24a as the support portion 60 is attached and detached from the body portion 24a.

As explained below, the sensor component 64 senses the operating position of the shift unit 28 such that a shift or operation position of the shift unit 28 can be sent to the cycle computer 18 via the printed circuit board 62 and the electrical wire 20. In other words, the electrical wire 20 electrically connects the cycle computer 18 to the printed circuit board 62 for receiving electrical signals or commands from the sensor component 64 and the user operating switch 66. The electrical wire 20 is an electrical wire member that has a plurality of conductors. The electrical wire 20 is at least partially disposed inside the body portion 24a of the bracket 24 and at least partially disposed outside of the body portion 24a of the bracket 24 in the illustrated embodiment. Some of the conductors of the electrical wire 20 are electrically connected to the sensor component 64 via the printed circuit board 62, while other of the conductor of the electrical wire 20 are electrically connected to the user operating switch 66 via the printed circuit board 62.

Figure 13:
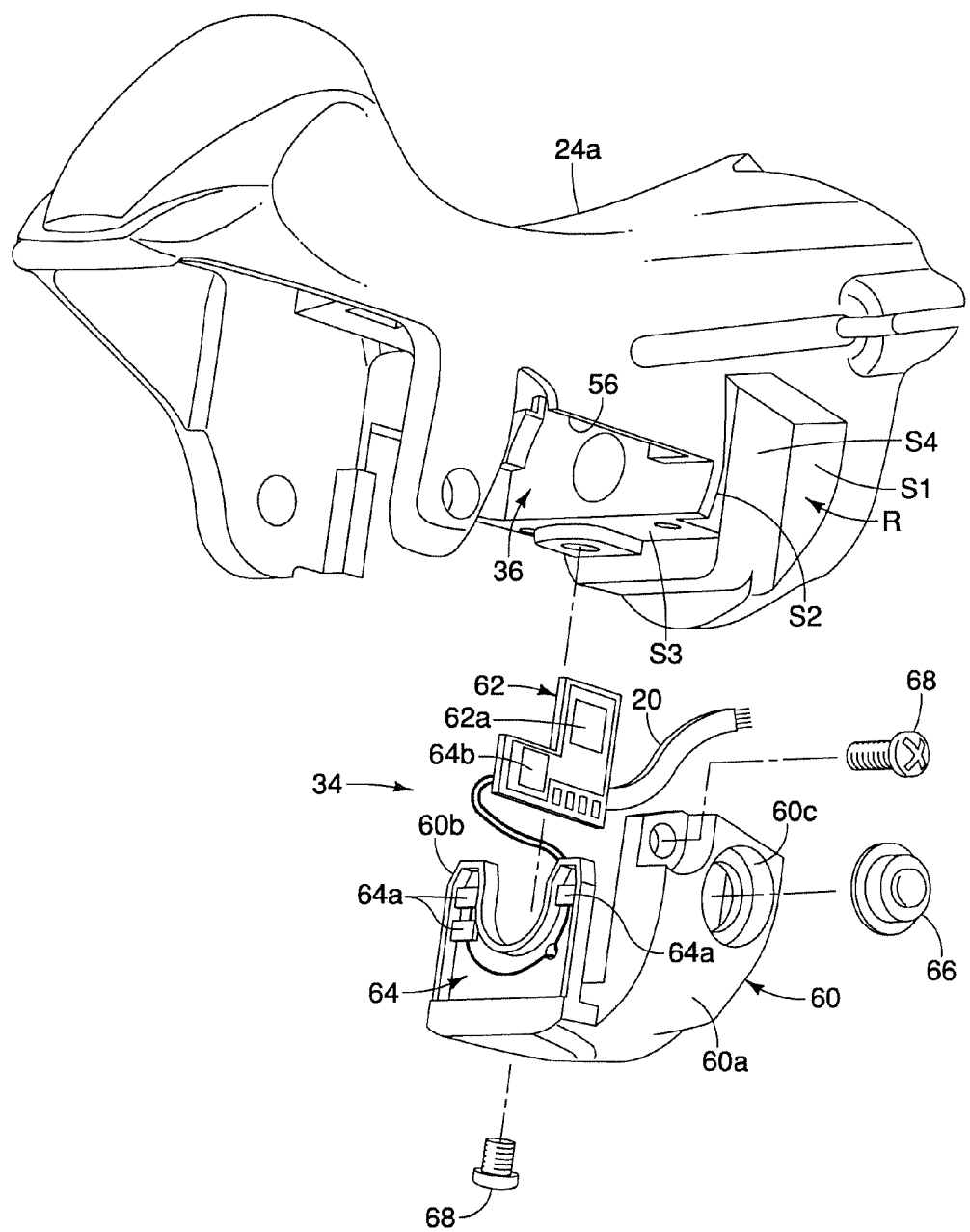
FIG. 13 is an exploded perspective view of the bracket of the right hand side shift operating device.

Of course, it will be apparent to those skilled in the bicycle field that the cycle computer 18 can provided with a wireless receiver and the printed circuit board 62 can provided with a wireless transmitter or other wireless communication device to communicate wirelessly. For example, the position sensing device 34 can have a wireless transmitter on the printed circuit board 62 that wirelessly communicates position signals from the sensor component 64 to a wireless receiver of the cycle computer 18 and that wirelessly communicates a user input signal from the user operating switch 66 to the wireless receiver of the cycle computer 18. Also the printed circuit board 62 can include a microprocessor 62a, as shown in FIG. 13, for processing the signals from the sensor component 64 and the user operating switch 66. Then the position sensing device 34 transmit the processed signals to the cycle computer 18 via wire 20 or wirelessly. Alternatively, the signals from the sensor component 64 can be completely processed by a microprocessor within the cycle computer 18. By providing the printed circuit board 62 with the microprocessor 62a, the calibrating and modes of operation can be set by the position sensing device 34 such that the cycle computer 18 is only used as a remote display for the position sensing device 34.

Referring now to FIG. 13, the sensor component 64 of the position sensing device 34 will now be discussed in more detail. Basically, in the illustrated embodiment, the sensor component 64 is configured to detect ten predetermined operation positions. In other to detect ten predetermined operation positions, the sensor component 64 includes a plurality of sensor elements 64a and an analog-to-digital conversion unit 64b. The sensor elements 64a are electrically connected to the analog-to-digital conversion unit 64b to form three Hall-effect digital sensors. The analog-to-digital conversion unit 64b can be formed of several separate analog-to-digital conversion units with one for each of the sensor elements 64a or can be combined together as a single analog-to-digital conversion unit as shown Of course, it will be apparent to those skilled in the bicycle field that the sensor component 64 can be constructed with only a single sensor element that would be electrically connected to the analog-to-digital conversion unit 64b to form a single Hall-effect digital sensor as needed and/or desired. For example, if the sensor component 64 were to be configured to detect only two predetermined operation positions, then the sensor component 64 would preferably only include one of the sensor elements 64a which would be electrically connected to the analog-to-digital conversion unit 64b.

In any case, in the illustrated embodiment, the sensor elements 64a are directly mounted on the second part 60b of the support portion 60, while the analog-to-digital conversion unit 64b is provided on the printed circuit board 62 that is mounted directly on the first part 60a of the support portion 60. In illustrated embodiment, the position sensing device 34 includes three Hall-effect digital sensors that are formed with the sensor elements 64a and the analog-to-digital conversion unit 64b. Each of the sensor elements 64a in conjunction with the analog-to-digital conversion unit 64b forms the Hall-effect digital sensor that is an integrated circuit that switches in response to changes in magnetic fields near the sensor elements 64a. In other words, each of the sensor elements 64a constitutes a magnetic sensing portion. Thus, the hall-effect digital sensor (i.e., the parts 64a and 64b) is inserted through the insertion opening 56 of the body portion 24a and is disposed in the internal cavity 36 to sense movement of the shift unit 28 as discussed below.

Figure 12:
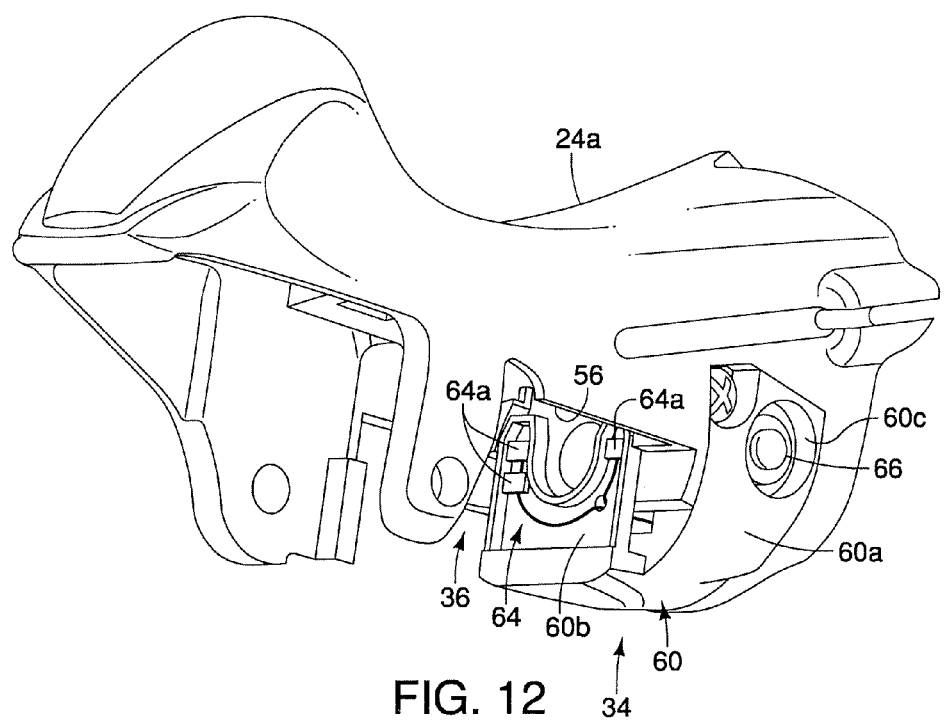
FIG. 12 is a perspective view of the bracket and the shift operating unit with the bottom access cover and the shift operating unit removed.

Referring to FIGS. 12 and 13, the user operating switch 66 is push type of contact switch that is disposed on the first part 60a of the support portion 60. Preferably, the user operating switch 66 is disposed in a location that the rider can easily access but which the rider will not accidently push during normal riding. The user operating switch 66 can be accessed through an opening in the grip cover 38 if needed and/or desired. The first part 60a of the support portion 60 has a recess 60c in which disposed the user operating switch 66 as seen in FIGS. 12 and 13. The user operating switch 66 is either partly or entirely disposed in this recess 60c to avoid accidently pressing of the user operating switch 66 by the rider. In other words, by recessing the user operating switch 66 from the exterior surface of the first part 60a of the support portion 60, accidental operation of the user operating switch 66 can most likely be prevented.

In this embodiment, the user operating switch 66 is disposed on the inside surface of the body portion 24a with respect to the vertical center longitudinal plane of the bicycle 10 when the support portion 60 is attached the body portion 24a and the bracket 24 is installed on the handlebar 16 as seen in FIG. 1. However, the user operating switch 66 can be disposed on the outside surface or the bottom surface of the body portion 24a with respect to the vertical center longitudinal plane of the bicycle 10 when the support portion 60 is attached the body portion 24a and the bracket 24 is installed on the handlebar 16.

As seen in FIG. 13, the body portion 24a has a recess R that constitutes a position regulating portion, which regulates a position and orientation of the support portion 60 with respect to the body portion 24a. The sensor component 64 should be disposed exactly with respect to the wire take-up member 72 to ensure accurate detection of the position of the wire take-up member 72. In other words, with the support portion 60 attached to the body portion 24a, the position regulating portion (e.g., the recess R) of the body portion 24a regulates the position and orientation of the support portion 60, so that the sensor component 64 can be disposed exactly with respect to the wire take-up member 72. The position regulating portion (e.g., the recess R) of the body portion 24a regulates the position of the sensor component 64 in both the axis direction of the wire take-up member 72 and the rotational direction of axis of the wire take-up member 72.

In the illustrated embodiment, the recess R includes several contact surfaces of the body portion 24a that form the position regulating portion of the body portion 24a. In particular, in the illustrated embodiment, the recess R preferably at least includes a first contact surface S1, a second contact surface S2, a third contact surface S3 and a fourth contact surface S4. These contact surfaces S1 to S4 contact four mating contact surfaces of the support portion 60, respectively. The first and second contact surfaces S1 and S2 are parallel and spaced apart in the axis direction of the wire take-up member 72. The third contact surface S3 faces downward when the bracket 24 attached the handlebar 16. The fourth contact surface S4 faces inward towards the center longitudinal plane of the bicycle 10 when the bracket 24 attached the handlebar 16. The third and fourth contact surfaces S3 and S4 are perpendicular to each other. The third and fourth contact surfaces S3 and S4 are also perpendicular to the first and second contact surfaces S1 and S2. However, the recess R can have fewer than these four contact surfaces S1 to S4 for forming the position regulating portion of the body portion 24a. Preferably, the recess R preferably includes at least two contact surfaces that contact at least two mating contact surfaces of the support portion 60.

As seen in FIG. 12, when the support portion 60 is attached to the body portion 24a, the first part 60a of the support portion 60 constitutes a part of the bracket 24. In particular, with the support portion 60 attached to the body portion 24a, the first part 60a is disposed in the recess R of the body portion 24a such that an exterior surface of the first part 60a smoothly meets with an exterior surface of the body portion 24a. In other words, the exterior surfaces of the body portion 24a and the first part 60a substantially connect in a continuous manner. Also as seen in FIGS. 9 and 10, the exterior surface of the first part 60a smoothly meets with an exterior surface of access cover 24b when the when the support portion 60 is attached to the body portion 24a. The support portion 60 can be detached from the body portion 24a while the access cover 24b remains attached to the body portion 24a. With the support portion 60 detached from the body portion 24a, a portion of the recess R forms a slot which connects to the internal cavity 36 of the body portion 24a.

The first part 60a of the support portion 60 is disposed in the slot of the recess R. The support portion 60 is disposed near the handlebar 16. However, a part of the body portion 24a is located between the support portion 60 and the rear surface of the body portion 24a that is attached to the handlebar 16. In this embodiment, the first part 60a of the support portion 60 has a substantially L shaped configuration as viewed along the axis direction of the wire take-up member 72. The fasteners 68 are disposed at the opposite ends of the first part 60a of the support portion 60. Thus, each end of the L-shape of the first part 60a has a fastener hole for receiving one of the fasteners 68 therethrough. The first part 60a is provided with two recesses that surround that the fastener holes in the ends of the first part 60a, respectively. Each of the fastener holes constitutes a first portion which receives a screw portion of one of the fasteners 68. Each of the recesses constitutes a second portion which receives a head portion of one of the fasteners 68 such as the heads of the fasteners 68 do not protrude outward from the exterior surface of the support portion 60.

Alternatively, the grip cover 38 can overlie the user operating switch 66 such that rider pushes on the grip cover 38 to depress the user operating switch 66. The user operating switch 66 is preferably arranged to engage electrical contacts on the printed circuit board 62 when the rider depresses the user operating switch 66. The user operating switch 66 can be used for a variety of functions, including, but not limited to, changing modes of operation of the position sensing device 34, displaying modes on the cycle computer and calibrating the position sensing device 34.

Referring back to FIG. 2, the shift unit 28 will now be briefly discussed. In the illustrated embodiment, the shift unit 28 is a cable operating device that includes, among other parts, a shift unit axle or shaft 70, a cable or wire take-up member or spool 72, a cable pulling mechanism 74, a cable releasing mechanism 76 and a position maintaining mechanism 78. The shift unit axle 70 defines the main pivot axis A of the shift unit 28. These mechanisms 74, 76 and 78 are preferably conventional mechanisms or other suitable mechanisms that are used in a bicycle shifter such as a road shifter to control the movement of the wire take-up member 72. Thus, these mechanisms 74, 76 and 78 of the shift unit 28 will not be discussed in detail herein. Rather, these mechanisms 74, 76 and 78 of the shift unit 28 will only be discussed and illustrated to the extent needed to understand the interaction between the shift unit 28 and the position sensing device 34.

The wire take-up member 72 constitutes one example of a movable portion of the shift unit 28 that selectively moves between a plurality of predetermined operating positions. The wire take-up member 72 includes a plurality of magnets or magnetic portions 80. In particular, the take-up member 72 includes five of the magnetic portions 80 so that the sensor component 64 can detect ten predetermined operating positions using three of the sensor elements 64a. In the illustrated embodiment, each of the magnetic portions 80 constitutes a sensed component of the shift unit 28. Alternatively, the magnetic portions 80 can be attached to some other that moves in such a manner as to be able to indicate the position of the wire take-up member 72.

The magnetic portions 80 of the wire take-up member 72 rotate around the shift unit axle 70 of the shift unit 28 in response to the rider operating the operating levers 30 and 32. The position sensing device 34 (Hall-effect digital sensor) is an integrated circuit that switches in response to changes in magnetic fields created by movement of the magnetic portions 80 near the sensor elements 64a, which at least partially surrounds the shift unit axle 70 of the shift unit 28. In particular, the sensor elements 64a are disposed on the second part 60b of the support portion 60 at locations spaced apart around the shift unit axle 70 of the shift unit 28. The second part 60b of the support portion 60 has a U shape portion which straddles the shift unit axle 70 of the shift unit 28. In the illustrated embodiment, each of the magnetic portions 80 is a permanent bar magnet that has a north pole and a south pole. Since the bicycle shift operating device 12 of the illustrated embodiment only has ten positions, the magnetic portions 80 includes five bar magnets, with each having a south pole S and a north pole N. Of course, it will be apparent from this disclosure that the number of magnets can be greater or fewer as needed and/or desired.

The sensor elements 64a are sensitive to a presence of a magnetic field so as to generate an analog signal. Thus, the sensor element 64a detects one of the magnetic portions 80 to produce a first analog signal when the sensor element 64a is located in the magnetic field of a south pole S of one of the magnetic portions 80 and produce a second analog signal when the sensor element 64a is located in the magnetic field of a north pole N of one of the magnetic portions 80. The analog-to-digital conversion unit 64b is configured to convert the analog signal from each of the sensor elements 64a into a digital signal to identify one of the predetermined operating positions of the wire take-up member 72 (i.e., the movable portion). In particular, the analog-to-digital conversion unit 64b outputs a first digital signal indicative of a first operating (gear) position of the predetermined operating positions of the wire take-up member 72 (i.e., the movable portion) when one of the sensor elements 64a senses the south pole S of one of the magnetic portions 80. The analog-to-digital conversion unit 64b outputs a second digital signal indicative of a second operating (gear) position of the predetermined operating positions of the wire take-up member 72 (i.e., the movable portion) when one of the sensor elements 64a senses the north pole N.

The position sensing device 34 generally switches to a first signal state when the magnetic field of the south pole S of one of the magnetic portions 80 comes close to produce a sufficient strength at one of the sensor elements 64a, and switches to a second signal state when the magnetic field of the north pole of one of the magnetic portions 80 comes close to produce a sufficient strength at one of the sensor elements 64a. However, no output signal (e.g., a third signal state) is produce if the magnetic field is removed from the sensor elements 64a. Hall-effect digital sensors are well known devices that are commercially available. Thus, the position sensing device 34 will not be discussed and/or illustrated in detail herein. Moreover, while the position sensing device 34 produces the first and second electrical signals in illustrated embodiment, as mentioned above, it will be apparent from this disclosure that that the position sensing device 34 can produce a single signal indicative of one operating position of the wire take-up member 72 (i.e., the movable portion) and then produce no signal when the operating position of the wire take-up member 72 is in another one operating positions of the wire take-up member 72 (i.e., the movable portion).

Figure 14:
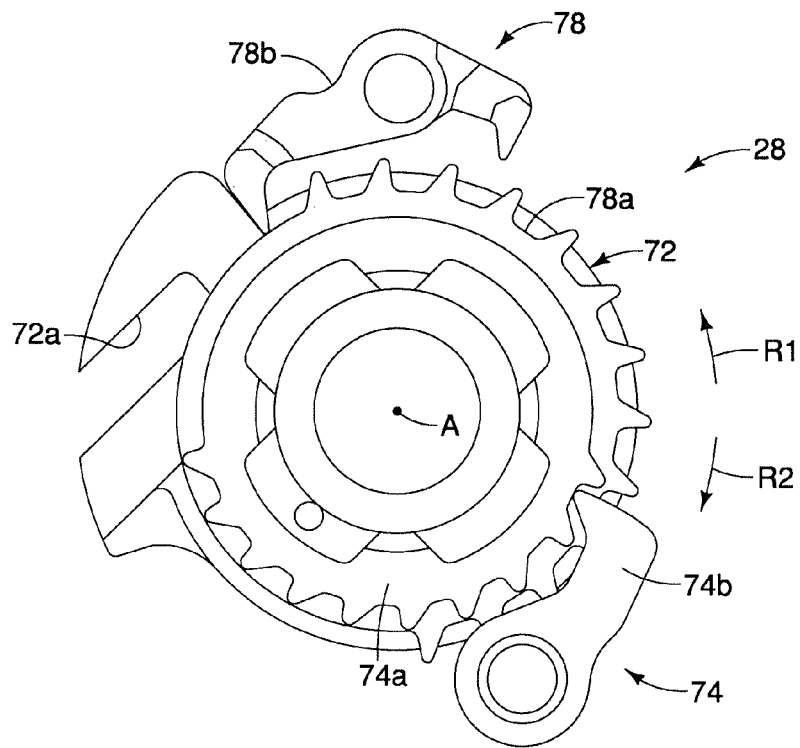
FIG. 14 is a front elevational view of selected parts of the shift operating unit with the selected parts in their rest positions.
Figure 15:
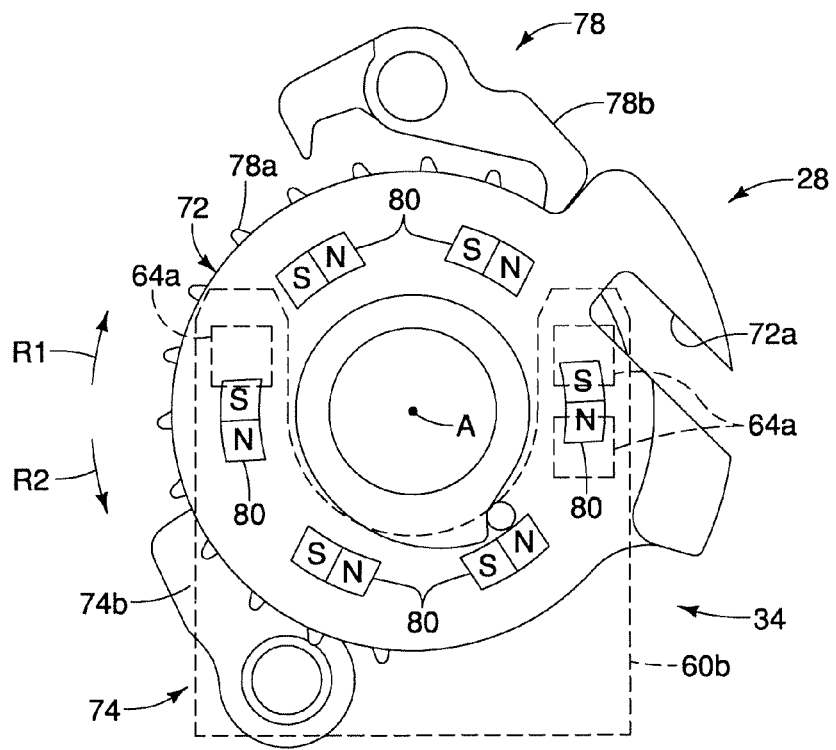
FIG. 15 is a rear elevational view of selected parts of the shift operating unit shown in FIG. 14 with the selected parts in their rest positions.

Basically, the take-up member 72 pivots in opposite rotational directions about the main pivot axis A in response to operation of the mechanisms 74, 76 and 78 by the rider operating one of the operating levers 30 and 32. The take-up member 72 has a shift wire attachment structure 72a for attaching the inner wire 21a of the cable 21 thereto. Generally, the brake/shift operating lever 30 is operatively coupled to the cable pulling mechanism 74 of the shift unit 28 to operate the shift unit 28 (mainly, the wire take-up member 72) in a first operating direction R1 about the shift unit axle 70 of the shift unit 28 for pulling the inner wire 21a of the cable 21 as seen in FIGS. 14 and 15. In other words, this operation of the brake/shift operating lever 30 causes the wire take-up member 72 to rotate in the first rotational direction R1 (i.e., a cable pulling direction). The shift operating lever 32 is operatively coupled to the cable releasing mechanism 76 of the shift unit 28 to operate the shift unit 28 (mainly, the wire take-up member 72) in a second operating direction R2 about the shift unit axle 70 of the shift unit 28 for releasing the inner wire 21a of the cable 21 as seen in FIGS. 14 and 15. In other words, this operation of the shift operating lever 32 causes the wire take-up member 72 to rotate in the second rotational direction R2 (i.e., a cable releasing direction). The second rotational direction R2 is opposite to the first rotational direction R1 as seen in FIGS. 14 and 15.

As seen in FIGS. 14 and 15, selected parts of the cable pulling mechanism 74 and the position maintaining mechanism 78 are illustrated for controlling the movement of the wire take-up member 72 in response to the operation of the operating levers 30 and 32. The cable pulling mechanism 74 includes a cable pulling ratchet 74a that is fixed to the wire take-up member 72 and a cable pulling pawl 74b that is arranged to selectively engage the cable pulling ratchet 74a. The position maintaining mechanism 78 includes a position maintaining ratchet 78a that is fixed to the wire take-up member 72 and a position maintaining pawl 78b that is arranged to selectively engage the position maintaining ratchet 78a. Since the position sensing device 34 does not depend upon the precise structure of the shift unit 28, the remaining parts of the shift unit 28 will not be further discussed in detail herein. In fact, the position sensing device 34 can be applied to other types of the shift control unit and/or other bicycle components with a movable portion that has a plurality of predetermined operating positions.

Now the operation of the position sensing device 34 will be discussed in more detail. The position sensing device 34 can be configured to be used with bicycle shift operating devices having a variety of different number of operating positions. For example, the position sensing device 34 can be configured to be used with a bicycle shift operating device that either operates a front derailleur for a drive train with two or more front sprockets or operates a rear derailleur for a drive train with two or more rear sprockets.

In a case where the bicycle shift operating device 12 is used to operate a rear derailleur in conjunction with a drive train having ten gear positions, the position of the wire take-up member 72 is sensed by the position sensing device 34 to indicate each of the ten gear positions of the rear derailleur. In particular, the position sensing device 34 produces ten different electrical signals that is indicative of a current position of the wire take-up member 72. These electrical signals are sent to the cycle computer 18, where the current gear position of the rear derailleur is displayed to the rider. Thus, the position sensing device 34 is configured and arranged to produce a plurality of electrical signals to indicate a current operating (gear) position of the rear derailleur based on a current operating position of the shift unit 28.

In a case where the bicycle shift operating device 12 is used to operate a front derailleur in conjunction with a drive train having only two front sprockets, the position of the wire take-up member 72 is sensed by the position sensing device 34 to indicate the top and low gear positions of the front derailleur. In particular, the position sensing device 34 produces a first electrical signal that is indicative of the wire take-up member 72 being in a pulled position, which corresponds to the top gear position, e.g., after the brake/shift operating lever 30 has been operated. The first electrical signal is sent to the cycle computer 18, where the top gear position of the front derailleur is displayed to the rider. When the wire take-up member 72 is in a released position (e.g., the shift operating lever 32 has been operated), a second electrical signal is produced that is indicative of the wire take-up member 72 being in the released position, which corresponds to the low gear position of the front derailleur 26. This second electrical signal is sent to the cycle computer 18, where the low gear position of the front derailleur 26 is displayed to the rider. Of course, the position sensing device 34 can be modified to produce additional signals or no signal to indicative of a particular position of the front derailleur as needed and/or desired. Thus, the position sensing device 34 is configured and arranged to produce one or more electrical signals to indicate a position of the front derailleur based on a current position of the shift unit 28.

In any case, the cycle computer 18 functions as a gear position identifying unit that is configured to identify one of the predetermined operating (gear) positions of the wire take-up member 72 (i.e., the movable portion) based on the digital signals from the analog-to-digital conversion unit 64b of the position sensing device 34. In particular, the cycle computer 18 (position identifying unit) identifies the first operating (gear) position of the predetermined operating positions of the wire take-up member 72 (i.e., the movable portion) when one of the sensor elements 64a senses the south pole S one of the magnetic portions 80. The cycle computer 18 (position identifying unit) identifies the second operating (gear) position of the predetermined operating positions of the wire take-up member 72 (i.e., the movable portion) when one of the sensor elements 64a senses the north pole N one of the magnetic portions 80.

In the above discussed embodiments, the position sensing device 34 was installed on a cable operated shift operating device, which is merely a selected example. In other words, the position sensing device 34 is not limited to use in a cable operated shifting system, but rather the position sensing device 34 can be used with other types of devices. For example, the position sensing device 34 can be used with pneumatically operated shifting system, or hydraulically operated shifting system.

Figure 16:
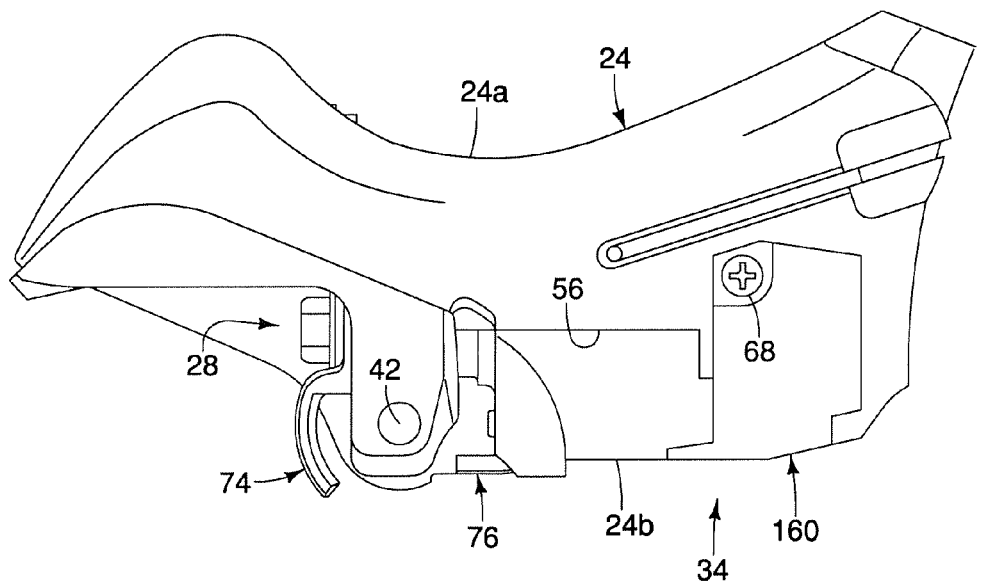
FIG. 16 is a side elevational view of the bracket (base member) and the shift operating unit with the bottom access cover installed over a portion of the insertion opening of the bracket.
Figure 17:
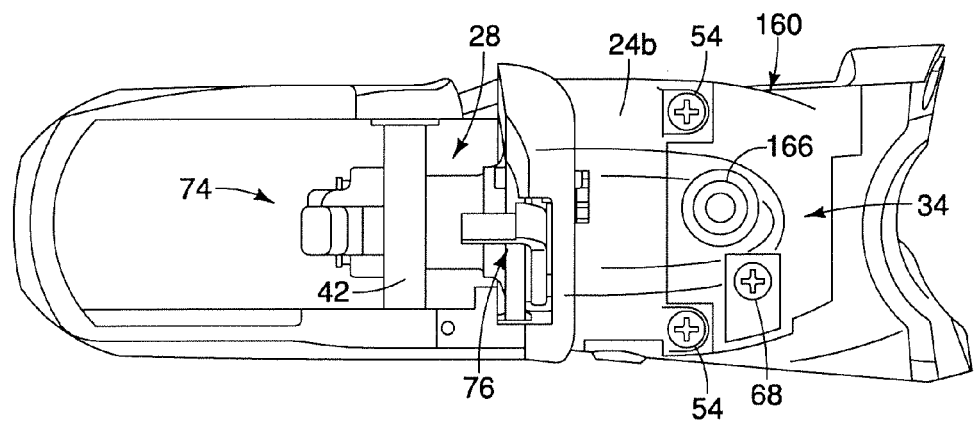
FIG. 17 is a bottom plan view of the bracket and the shift operating unit with the bottom access cover installed over a portion of the insertion opening of the bracket.

Referring to FIGS. 16 and 17, an alternate support portion 160 is illustrated that is mounted to the bracket 24. The support portion 160 is releasably attached to the body portion 24a of the bracket 24 by the fasteners 68 in the same manner as the support portion 60. In this embodiment, a user operating switch 166 is provided on a bottom surface of the support portion 60. The user operating switch 66 is preferably either partly or entirely disposed in a recess to avoid accidently pressing of the user operating switch 66 by the rider. With this embodiment of FIGS. 16 and 17, the printed circuit board is preferably supported by the support portion 60 in a generally horizontal orientation instead of a generally vertical orientation with the bracket 24 installed on the handlebar 16.

In the above discussed embodiments, the sensor component 64 is configured to detect ten predetermined operation positions, but sensor component 64 can be configured to detect six, seven, eight, nine or eleven predetermined operation positions. While the user operating switch 66 is located on the support portion 60 in the above discussed embodiments, the user operating switch 66 does not need to be disposed on the support portion 60. Moreover, a plurality of switches can be disposed on the support portion 60 instead of using a single user operating switch as shown in the illustrated embodiments. In the above discussed embodiments, the sensor elements 64a are directly mounted on the second part 60b of the support portion 60, but the sensor elements 64a can be directly mounted on the printed circuit board. In this case, the second part 60b of the support portion 60 is configured as the printed circuit board with the sensor elements 64a thereon, or the printed circuit board with the sensor elements 64a thereon is mounted on the second part 60b of the support portion 60.

In understanding the scope of the present invention, the term "comprising" and its derivatives, as used herein, are intended to be open ended terms that specify the presence of the stated features, elements, components, groups, and/or integers, but do not exclude the presence of other unstated features, elements, components, groups, and/or integers. The foregoing also applies to words having similar meanings such as the terms, "including", "having" and their derivatives. As used herein to describe the above embodiment(s), the following directional terms "forward", "rearward", "top", "bottom", "above", "below", "downward", "vertical", "horizontal", "inner", "outer" and "transverse" as well as any other similar directional terms refer to those directions of a bicycle equipped with the bicycle shift operating device on a flat horizontal surface. Accordingly, these terms, as utilized to describe the bicycle shift operating device should be interpreted relative to a bicycle equipped with the bicycle shift operating device as used in the normal riding position on a flat horizontal surface. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Components that are shown directly connected or contacting each other can have intermediate structures disposed between them. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle shift operating device comprising:
   a base member including a bicycle handlebar mounting structure and a body portion with an internal cavity, the body portion having a first end and a second end, the bicycle handlebar mounting structure being disposed on the first end, the first end having a curved handlebar contacting surface configured to mate with a forward facing surface of a downwardly curved portion of a drop down handlebar in an installed state of the handlebar mounting structure with respect to the drop down handlebar;
   a shift unit disposed in the internal cavity of the body portion, the shift unit including a wire takeup member that selectively moves between a plurality of predetermined operating positions; and
   a position sensing device removably attached to the body portion while the base member is attached to a bicycle, the position sensing device including a sensor component that senses the operating position of the wire takeup member.

2. The bicycle shift operating device according to claim 1, wherein
   the body portion has an opening in communication with the internal cavity of the body portion such that the position sensing device is inserted and removed through the opening.

3. The bicycle shift operating device according to claim 1, wherein
the position sensing device is attached to the body portion by a fastener.

4. The bicycle shift operating device according to claim 1, wherein
the wire takeup member includes a sensed component.

5. The bicycle shift operating device according to claim 1, wherein
the wire takeup member is rotatably mounted on a shaft; and
the position sensing device is arranged partially surrounding the shaft of the shift unit.

6. The bicycle shift operating device according to claim 5, wherein
the position sensing device includes a support portion, and
the sensor component includes a plurality of sensor elements disposed on the support portion at locations spaced apart around the shaft of the shift unit.

7. The bicycle shift operating device according to claim 6, wherein
the support portion is attached to the body portion by a fastener.

8. The bicycle shift operating device according to claim 1, wherein
the wire takeup member of the shift unit includes at least one magnetic portion.

9. The bicycle shift operating device according to claim 1, wherein
the sensor component includes at least one Hall-effect digital sensor.

10. The bicycle shift operating device according to claim 9, wherein
the hall-effect digital sensor is inserted through an opening in the body portion and is disposed in the internal cavity.

11. The bicycle shift operating device according to claim 1, wherein
the position sensing device includes at least one magnetic sensing portion.

12. The bicycle shift operating device according to claim 1, wherein
the position sensing device includes a user operating switch.

13. The bicycle shift operating device according to claim 12, wherein
the position sensing device is electrically coupled to an electrical wire member that is at least partially disposed outside of the base member.

14. The bicycle shift operating device according to claim 13, wherein
the user operating switch is electrically coupled to the electrical wire member.

15. A bicycle shift operating device comprising:
a base member including a body portion with an internal cavity, the body portion having a first end and a second end, the first end including a bicycle handlebar mounting structure;
a shift unit disposed in the internal cavity of the body portion, the shift unit including a movable portion that selectively moves between a plurality of predetermined operating positions;
a position sensing device removably attached to the body portion while the base member is attached to a bicycle, the position sensing device including a sensor component that senses the operating position of the movable portion; and
a first operating member pivotally mounted to the body portion about a first axis to perform a braking operation, the first operating member also being pivotally arranged to pivot about a second axis to operate the shift unit, the second axis being non coaxial with respect to the first axis,
the position sensing device being arranged between the first end and the first axis.

16. The bicycle shift operating device according to claim 15, further comprising
a second operating member operatively coupled to the shift unit such that operation of the first operating member causes a wire takeup member of the shift unit to rotate in a first rotational direction and operation of the second operating member causes the wire takeup member of the shift unit to rotate in a second rotational direction, which is opposite to the first rotational direction.

17. A bicycle shift operating device comprising:
a base member including a body portion with an internal cavity, the body portion having a first end and a second end, the first end including a bicycle handlebar mounting structure;
a shift unit disposed in the internal cavity of the body portion, the shift unit including a movable portion that selectively moves between a plurality of predetermined operating positions;
a first user operated member pivotally mounted to a support member about an axis to operate the shift unit, the support member being attached to the body portion; and
a position sensing device removably attached to the body portion while the base member is attached to a bicycle and while the base member is not attached to a bicycle, the position sensing device including a sensor component that senses the operating position of the movable portion, the position sensing device being arranged between the first end and the support member.

18. The bicycle shift operating device according to claim 17, wherein
the first user operated member is pivotally mounted to the support member about a first axis to perform a braking operation,
the first user operated member is pivotally mounted to the support member about a second axis to operate the shift unit, and
the first axis is non coaxial with respect to the second axis.

19. The bicycle shift operating device according to claim 18, further comprising,
a second user operated member operatively coupled to the shift unit such that operation of the first user operated member causes the movable portion of the shift unit to rotate in a first rotational direction and operation of the second user operated member causes the movable portion of the shift unit to rotate in a second rotational direction, which is opposite to the first rotational direction.

* * * * *